(12) United States Patent
Chien et al.

(10) Patent No.: US 9,559,784 B2
(45) Date of Patent: Jan. 31, 2017

(54) OPTICAL COMMUNICATION BASED ON POLARIZATION DEPENDENT COHERENT OPTICAL NYQUIST FREQUENCY DIVISION MULTIPLEXING

(71) Applicant: ZTE Corporation, Shenzhen (CN)

(72) Inventors: Hung-Chang Chien, Bridgewater, NJ (US); Jianjun Yu, Basking Ridge, NJ (US); Ze Dong, Morristown, NJ (US)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 14/066,620

(22) Filed: Oct. 29, 2013

(65) Prior Publication Data

US 2014/0233949 A1    Aug. 21, 2014

Related U.S. Application Data

(60) Provisional application No. 61/720,367, filed on Oct. 30, 2012.

(51) Int. Cl.

| | | |
|---|---|---|
| *H04B 10/04* | (2006.01) | |
| *H04B 10/12* | (2006.01) | |
| *H04B 10/06* | (2006.01) | |
| *H04B 10/00* | (2013.01) | |
| *H04J 14/00* | (2006.01) | |
| *H04B 10/61* | (2013.01) | |
| *H04B 10/532* | (2013.01) | |

(52) U.S. Cl.
CPC ........ *H04B 10/6166* (2013.01); *H04B 10/532* (2013.01); *H04B 10/61* (2013.01)

(58) Field of Classification Search
CPC . H04B 10/2513; H04B 10/548; H04B 10/532; H04B 10/6166; H04B 10/61; H04B 10/611; H04B 10/614; H04B 10/6161; H04B 10/6971; H04L 27/2697; H04J 14/06

USPC ............................................ 398/65, 184, 79

See application file for complete search history.

(56) References Cited

U.S. PATENT DOCUMENTS

| | | | | |
|---|---|---|---|---|
| 7,076,168 | B1 * | 7/2006 | Shattil | H04B 10/25752 398/202 |
| 7,146,103 | B2 * | 12/2006 | Yee | H04B 10/2507 398/152 |
| 7,418,043 | B2 * | 8/2008 | Shattil | H04L 1/04 375/260 |
| 7,623,580 | B2 * | 11/2009 | McNaught-Davis Hess | H04H 20/28 375/219 |

(Continued)

OTHER PUBLICATIONS

R. Schmogrow et al., "Nyquist Frequency Division Multiplexing for Optical Communication" May 6-11, 2012 at CLEO: Science and Innovations 2012 San Jose, CA.*

(Continued)

*Primary Examiner* — Ken N Vanderpuye
*Assistant Examiner* — Abbas H Alagheband
(74) *Attorney, Agent, or Firm* — Perkins Coie LLP

(57) ABSTRACT

An optical transmitter transmits a dual polarization optical Nyquist frequency domain multiplexed signal. The signal includes a first polarization component and a second polarization component. Each component comprises multiple subchannels, possibly having different subchannel bandwidths and different modulation schemes. An optical receiver receives the signal and recovers transmitted data.

18 Claims, 9 Drawing Sheets

(56) References Cited

U.S. PATENT DOCUMENTS

| | | | | |
|---|---|---|---|---|
| 8,098,751 | B2* | 1/2012 | Shattil | H04L 1/04 375/260 |
| 8,306,435 | B2* | 11/2012 | Armstrong | H04B 10/67 398/183 |
| 8,379,698 | B2* | 2/2013 | Murray | H04B 1/0483 375/130 |
| 8,498,294 | B1* | 7/2013 | Monk | H04L 12/2801 370/392 |
| 8,498,542 | B2* | 7/2013 | Frankel | H04B 10/5053 398/184 |
| 8,526,831 | B2* | 9/2013 | Winzer | H04B 10/6971 398/209 |
| 8,537,934 | B2* | 9/2013 | Joshi | H04L 27/152 375/260 |
| 8,699,880 | B2* | 4/2014 | Grigoryan | H04B 10/548 398/152 |
| 9,008,512 | B2* | 4/2015 | Nazarathy | H04B 10/272 398/65 |
| 2004/0141548 | A1* | 7/2004 | Shattil | H04L 1/04 375/146 |
| 2007/0004465 | A1* | 1/2007 | Papasakellariou | H04W 52/325 455/571 |
| 2007/0025421 | A1* | 2/2007 | Shattil | H04B 10/25752 375/136 |
| 2008/0310484 | A1* | 12/2008 | Shattil | H04L 1/04 375/146 |
| 2008/0310526 | A1* | 12/2008 | Maltsev | H04L 27/2628 375/260 |
| 2009/0324223 | A1* | 12/2009 | Liu | H04J 14/06 398/65 |
| 2010/0021166 | A1* | 1/2010 | Way | H04J 14/02 398/79 |
| 2010/0098411 | A1* | 4/2010 | Nakashima | H04B 10/60 398/25 |
| 2010/0142598 | A1* | 6/2010 | Murray | H04B 1/0483 375/219 |
| 2010/0142951 | A1* | 6/2010 | Armstrong | H04B 10/67 398/65 |
| 2010/0329683 | A1* | 12/2010 | Liu | H04B 10/2513 398/81 |
| 2011/0128175 | A1* | 6/2011 | Harris | H03M 1/0836 341/155 |
| 2011/0150477 | A1* | 6/2011 | Winzer | H04B 10/6971 398/65 |
| 2011/0176815 | A1* | 7/2011 | Frankel | H04B 10/5053 398/184 |
| 2011/0255870 | A1* | 10/2011 | Grigoryan | H04B 10/548 398/65 |
| 2012/0052822 | A1* | 3/2012 | Monroe | H04B 1/0071 455/90.2 |
| 2012/0129480 | A1* | 5/2012 | Ruelke | H04B 1/0021 455/296 |
| 2012/0141138 | A1* | 6/2012 | Yang | H04L 1/0003 398/158 |
| 2013/0156443 | A1* | 6/2013 | Lowery | H04B 10/6971 398/141 |
| 2013/0216228 | A1* | 8/2013 | Nazarathy | H04B 10/272 398/65 |
| 2014/0169501 | A1* | 6/2014 | Nazarathy | H03H 17/0266 375/316 |
| 2014/0219666 | A1* | 8/2014 | Tselniker | H04L 25/03019 398/208 |

OTHER PUBLICATIONS

Jianjun et al., "30-Tb/s (3x12.84 Tb/s) Signal Transmission over 320km Using PDM 64-QAM Modulation" Jan. 23, 2012d.*

Xing Yang et al., "A Fast Decoding Algorithm for Non-orthogonal Frequency Division Multiplexing Signals" 2007.*

Giulio Colavolpe, "faster-than-nyquist and beyond how to improve spectral efficiency by accepting interference" 2011.*

Jansen, S.L., et al., "121.9-Gb/s PDM-OFDM Transmission With 2-b/s/Hz Spectral Efficiency Over 1000 km of SSMF," Journal of Lightwave Technology, 27(3):177-188, Feb. 2009.

Schmogrow, R., et al., "Nyquist Frequency Division Multiplexing for Optical Communications," Conference on Lasers and Electro-Optics (CLEO), CTh1H.2, pp. 1-2, San Jose, California, May 2012.

* cited by examiner

OPTICAL COMMUNICATION BASED ON POLARIZATION DEPENDENT COHERENT OPTICAL NYQUIST FREQUENCY DIVISION MULTIPLEXING

CROSS REFERENCE TO RELATED APPLICATIONS

This patent document claims the benefit of priority of U.S. Provisional Patent Application No. 61/720,367, filed on Oct. 30, 2012. The entire content of the before-mentioned patent application is incorporated by reference as part of the disclosure if this patent document.

TECHNICAL FIELD

This patent document relates to systems, devices and techniques for processing of optical signals in optical communication.

BACKGROUND

Networks that use optical communications medium, such as fiber optic, are becoming increasingly popular to meet ever-growing bandwidth demand. Optical networks are often used to carry high bandwidth video data to/from users to the network and also in backhaul operation of a network.

SUMMARY

This patent document provides, among others, systems, devices and techniques that are useful in increasing data throughput achievable over an optical communications medium.

In one aspect, the disclosed techniques include the use of a dual polarization coherent optical Nyquist frequency division multiplexing signal for optical communication. The signal comprises two polarization components, each of which includes data modulated on multiple carriers, called a subchannel of data transmission, with each carrier having its own bandwidth and modulation constellation. A transmitter of the signal generates all carriers coherently, thereby allowing carrier recovery at the receiver side by recovering carrier from a subchannel having superior properties such as signal to noise ratio.

This and other aspects and their implementations are described in greater detail in the drawings, the description and the claims.

DETAILED DESCRIPTION

Several techniques are disclosed for optical communications using polarization dependent Nyquist frequency domain multiplexed signals. More specifically, two different optical polarizations are used in dual-polarization implementations described below.

Figure 1:
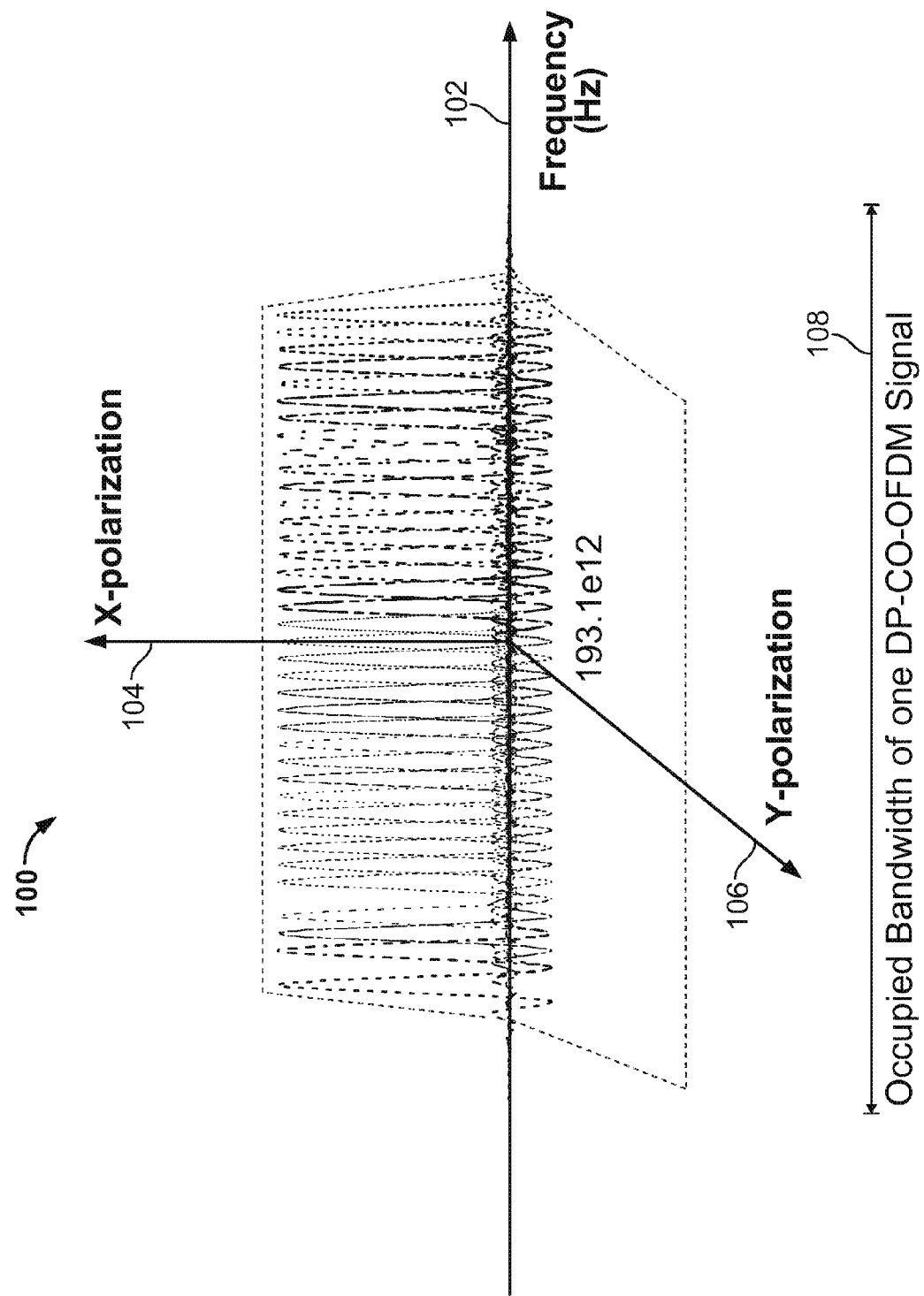
FIG. 1 shows spectrum of an optical orthogonal frequency domain multiplexed (OFDM) signal.

FIG. 1 illustrates spectrum 100 of an optical orthogonal frequency domain multiplexing (OFDM). The optical spectrum 100 comprises multiple subcarriers. The signal spectral amplitude is plotted with the horizontal axis 102 representing frequency in Hertz, axis 104 representing a first optical polarization plane (e.g., x-polarization) and the axis 106 representing a second, orthogonal polarization plane (e.g., y-polarization). The signal is shown to occupy bandwidth 108, which may be in the GigaHertz range (e.g., 1, 10 or 20 GHz). The signal may be used for optical transmissions in either a core network or an access network for <100 Gbps transmissions. For example, each individual subcarrier may be modulated with 64 quadrature amplitude modulation (QAM) to 256 QAM signals, with between 64 to 256 subcarriers spanning the entire bandwidth spectrum. One operational problem faced by the signal depicted in FIG. 1 is that the peak to average power ratio (PAPR) may be significantly high—e.g., reaching 100 dB or more. To maintain linearity and accuracy of hardware components used in transmission and reception is expensive or requires additional expensive equipment.

Figure 2:
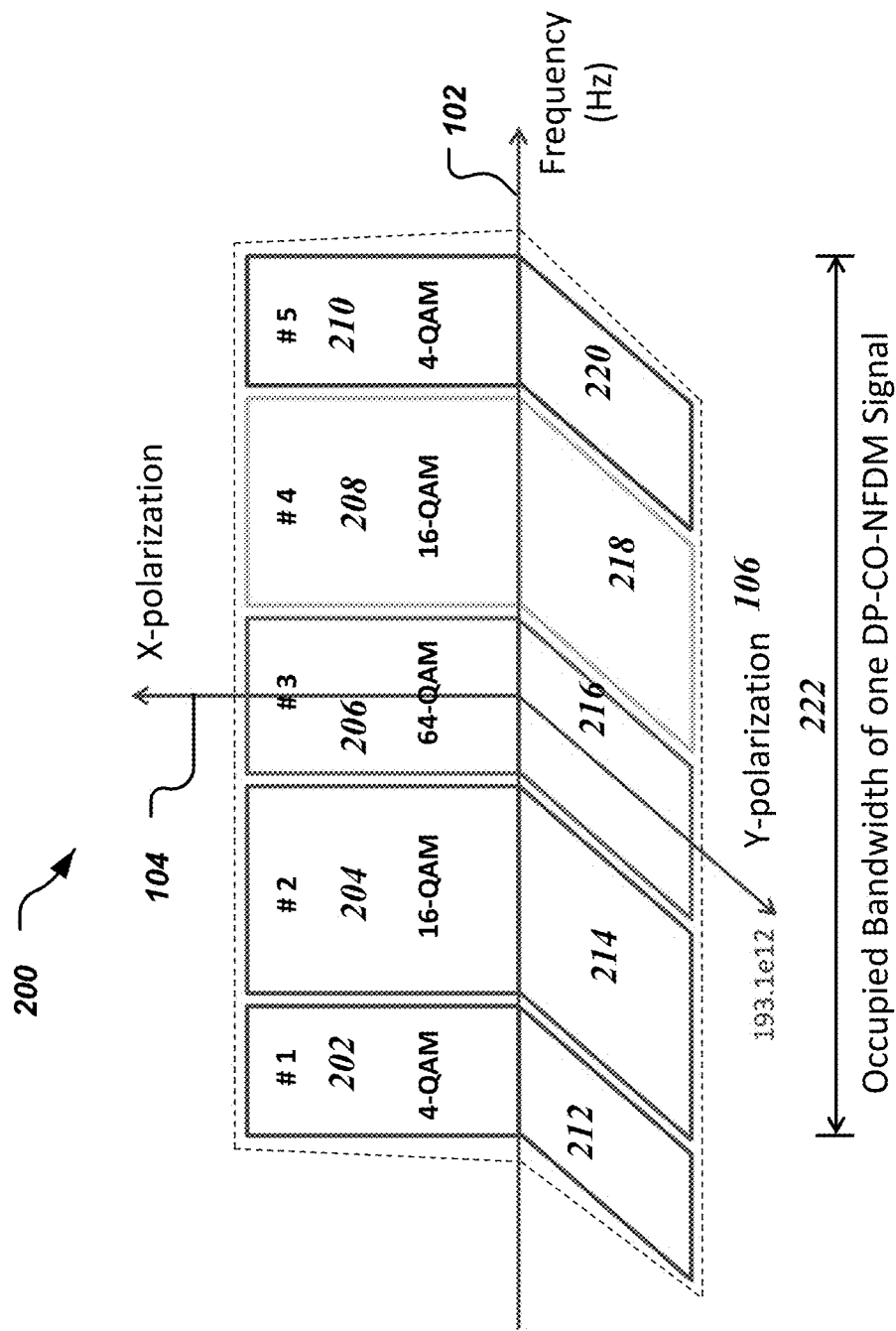
FIG. 2 illustrates spectrum of a dual-polarization optical Nyquist frequency domain multiplexed (NFDM) signal.

FIG. 2 depicts spectrum 200 of a Nyquist frequency domain multiplexed (NFDM) signal. The depicted signal 200 has five frequency bands, in two polarization directions. The frequency bands 202, 204, 206, 208 and 210 are in the x-polarization direction, corresponding to subchannels 1 to 5 of the x-polarized signal and 212, 214, 216, 218 and 220, corresponding to five subchannels of the signal polarized in the y-polarization direction. Each frequency band (subchannel) 202, 204, 206, 208, 210, 212, 214, 216, 218 and 220 may possibly have a different spectral magnitude, bandwidth and modulation constellation. For example, spectral region 1 (202, 212) is a 4-QAM modulated signal, spectra region 2 (204, 214) has 16-QAM modulation, and so on.

While the above-described example uses five subchannels, implementations could use a different number of subchannels depending on implementation-specific parameters such as complexity of receivers, expected characteristics of transmission channel (e.g., use a greater number of subchannels to combat spectral notches), and so on. Similarly, while the use of two different polarization components (e.g., orthogonally polarized x-polarization and y-polarization) is used for illustrative purpose for using two different polarizations to carry more channels to increase the bandwidth throughput, multiple different polarizations (more than two polarizations) could be used to further increase the bandwidth throughput.

In some implementations, the subchannels may occupy spectrum with guard bands separating neighboring subchannels. However, as further explained below, in general, the signal 200 does not need guard bands between subchannels. Furthermore, while cyclic prefix (CP) and training sequences are used with conventional OFDM signals (e.g., signal 100 depicted in FIG. 1), neither CP nor training sequence are needed for the signal 200, because each subchannel could be processed independently using techniques such as blind equalization that perform well without the need for CP. Not having to use CP could save about 10% overhead.

As described next, demultiplexing and demodulation of DP-CO-NFDM can be done individually for each Nyquist subchannel, and may be processed in parallel by controlling timing of the receive chain modules from a same controller. In some implementations, the dual polarized subchannels, e.g., subchannels 202 and 212 or subchannels 204 and 214, and so on, can be modulated to have the same frequency occupancy and with the same modulation constellation. Therefore, the receiver processing of these dual polarized subchannel pairs could benefit from each other. Therefore, in some implementations, the DP-CO-NFDM dual polarized signal lends itself to a single-chip (e.g., all circuits implemented on a same substrate and packaged within the same package) implementation. In general, even when dual polarized subchannel pairs are differently modulated, coherently controlling the receiver operation within the same single application specific integrated circuit (ASIC) is possible, The algorithm selected can be subchannel-dependent governed by the bit-loading levels, i.e., 4-QAM, 16QAM, 64QAM etc.

The higher spectral efficiency may be achieved by aggressive digital filtering, which allows for the subchannels to be placed closer to each other in the frequency domain, thereby reducing the unusable spectrum.

Furthermore, as explained below, each subchannel could be individually filtered and downconverted for processing, thereby eliminating the need to orthogonalize individual subchannels.

As previously noted, PAPR is often a concern in the design of traditional OFDM modulation systems. However, by splitting all available subcarriers within the frequency band 222 into a smaller number of subchannels (e.g., instead of having a 64 subcarrier OFDM system, using 5 carriers only, as depicted in FIG. 2), the output dynamic range is reduced. Therefore, in the modulated signal 200, as depicted in FIG. 2, PAPR becomes a minor issue. Therefore, in some implementations, the DP-CO-NFDM signal lends itself to linear modulator/power amplifier designs.

Figure 3:
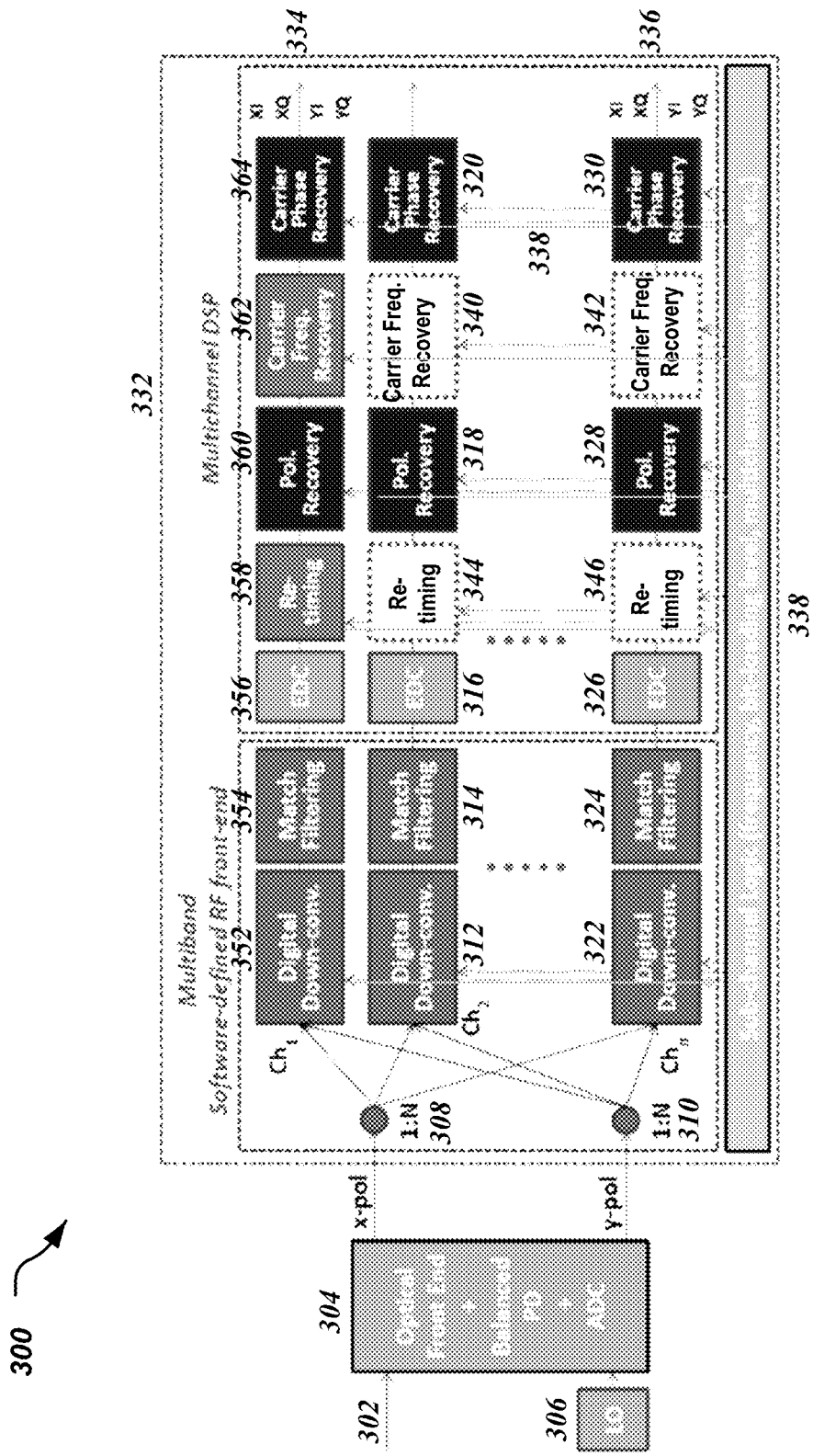
FIG. 3 is a block diagram representation of a dual-polarization coherent optical NFDM (DP-CO-NFDM) signal receiver.

FIG. 3 is a block diagram representation of a receiver 300 configured to receive the above discussed optical signals.

A DP-CO-NFDM signal 302 is input to the optical front end 304. The optical front end may also include an analog to digital converter (ADC), a balanced photo detector to detect the transmitted optical signal. A local oscillator 306 may also be used to assist the front end 304 with detection and reception of the optical signal 304.

The front end 304 outputs x-polarized signal to a 1:N repeater 308. N is the number of subchannels of the signal 302, which is known a-priori to the receiver 300. Similarly, the front end 304 outputs a y-polarized signal to the 1:N repeater 310. In some implementations, due to practical limits on how perfectly the x and y polarized signals can be separated, a small amount of x-polarized signal may leak into the y-polarized signal (e.g., at repeater 310). Similarly, y-polarized signal may leak into the x-polarized signal (e.g., at repeater 3080. The repeaters 308 and 310 produce N identical copies of the input signal at the output, each of which is subsequently used to recover modulated data from a subchannel of the signal 300.

Signal processing performed in the receive chain 312, 314, 316, 344, 318, 340 and 320 is now described (corresponding to subchannel 2), with the understanding that, unless otherwise noted, similar processing is performed in modules 322, 324, 326, 346, 328, 342 and 330 (subchannel n) and 352, 354, 356, 358, 360, 362 and 364 (corresponding to subchannel 1). Also, it is to be understood that, in each polarization direction, N receive chains are operating, corresponding to N subchannels in each polarization direction.

The digital downconverter 312 downcoverts the input signal to an intermediate frequency, or baseband, at which the receiver processing is performed. A matched filter 314 is operated upon the output of the downconverter 312 to extract a subchannel signal. In some implementations, the digital downconverter 312 and the matched filter 314 can be implemented in a software-defined radio frequency front end that can be programmed to operate at various frequencies and subchannel bandwidths. In some implementations, the matched filter 314 may be a raised cosine filter. The output of the matched filter is then processed through electronic dispersion compensation (EDC) 316. The output of EDC 316 is processed through a Re-timing function 344. In the re-timing module 344, the timing used for receiving the signal in the subchannel may be updated using timing recovered from the received signal. The polarization recovery 318 function may be operated in one of several ways, suitable to the implementer. The carrier frequency recovery 320 processing is used to estimate carrier frequency of the received signal. In some implementations a phase lock loop may be utilized for carrier frequency recovery. The carrier recovery 340 may be followed by a carrier phase recovery stage 320 in which the phase of the received signal is received (for each carrier of each subchannel). In some implementations, the carrier phase and frequency recovery stages may be performed in a single stage. At the output of the carrier phase recovery 320, in-phase and quadrature modulated symbol estimates 334 for both x and y signals are produced. These symbol estimates may further be decoded to recover modulated data.

All of the receiver functions discussed above and enclosed within the dashed line 332 are implementable in a single ASIC using ASIC design and fabrication tools available today. The sub-channel logic 338, which may be implemented at least partly in hardware or as a program running on a processor, may provide control signals to the receiver functions. The sub-channel logic 338 may be bidirectionally in communication with various receiver stages such as the down-conversion stages 312, 322, 352, the re-timing stages 344, 346, 358 and the carrier phase/frequency stage 320, 330, 340, 342, 362 and 364. The control signals may include information such as the frequency band to operate upon, the expected bit-loading level (e.g., constellation) that is to be demodulated, and so on. In some implementations, when the same constellation/signal strength or bandwidth are used for orthogonally polarized subchannel pairs, this commonality may be advantageously used to simplify implementation of the sub-channel logic 338 because a same control signal can be generated for the subchannel pairs. In some implementations, the sub-channel logic 338 may measure a received signal parameter such as single to noise ratio within each sub-channel receive chain. The sub-channel logic 338 may then use the estimate of received signal quality to decide a single receive chain re-timing and carrier recovery stage to perform actual computations on. The sub-channel logic 338 may be use the results obtained in this subchannel for the corresponding receive chain functions. For example, the sub-channel logic 338 may use the subchannel having the best estimated signal to noise ratio for carrier frequency/phase recover and for re-timing.

Figure 4:
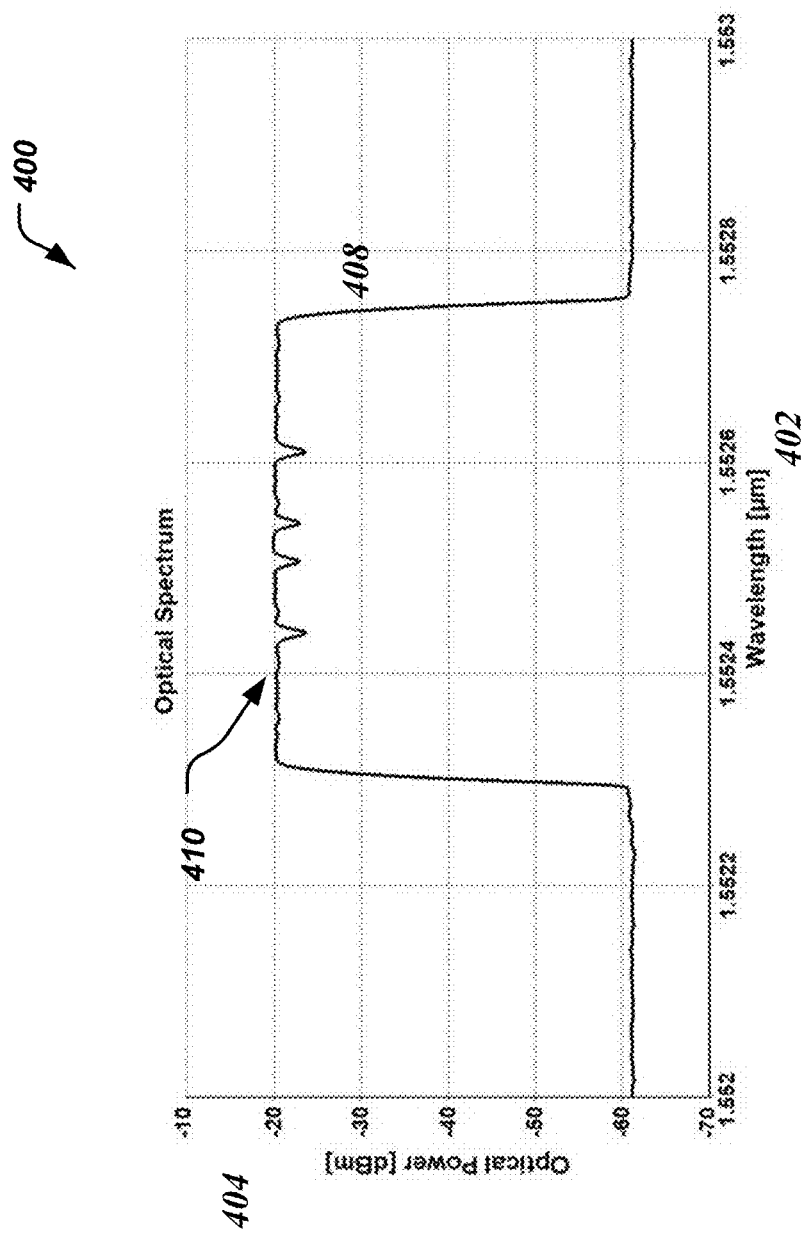
FIG. 4 is a spectral representation of a 5-channel DP-CO-NFDM signal.

FIG. 4 depicts a graphical display 400 of the spectrum 408 of a 5-channel DP-CO-NFDM signal. The horizontal axis 402 represents wavelength in micrometers. The vertical axis 404 represents optical power in the signal, measured in dBm. As can be seen from the region 410 of the spectrum 408, the five subchannels have different spectral bandwidth. The spectrum 408 provides 48 Gbps at DP-64QAM on subchannel 3, 128 Gbps at DP-16QAM on subchannels 2 and 4 and 128 Gbps at DP-4QAM on subchannels 1 and 5, thereby providing 304 Gbps at 55 GHz frequency.

Figure 5:
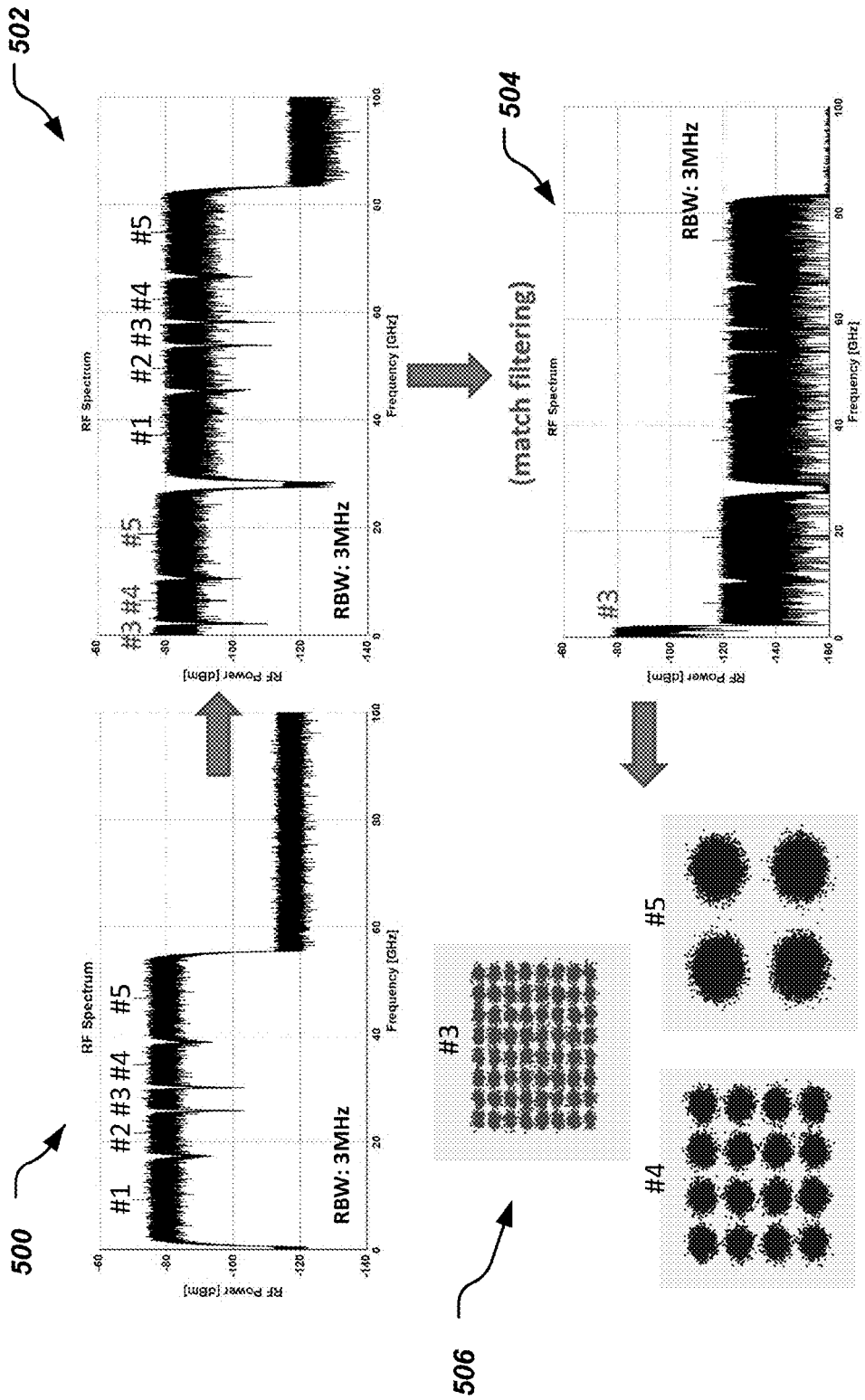
FIG. 5 depicts spectra and constellations of a 5-channel DP-CO-NFDM signal at intermediate steps, as it is being processed at an optical receiver.

FIG. 5 depicts intermediate snapshots while a received signal, such as the signal depicted in FIG. 4, is processed by an optical receiver, such as the receiver 300 described in FIG. 3. The graph 500 illustrates the 5-subchannel signal spectrum described with respect to FIG. 4. The graph 502 shows subchannels 3, 4 and 5, after digital downconversion. A matched filter depicted in graph 504 is applied to the spectrum shown in graph 502 to recover constellations 506, 508 and 510, corresponding to subchannels 3, 4, and 5 respectively. The signal 500 has 17 dB optical signal to noise ratio (OSNR).

Figure 6:
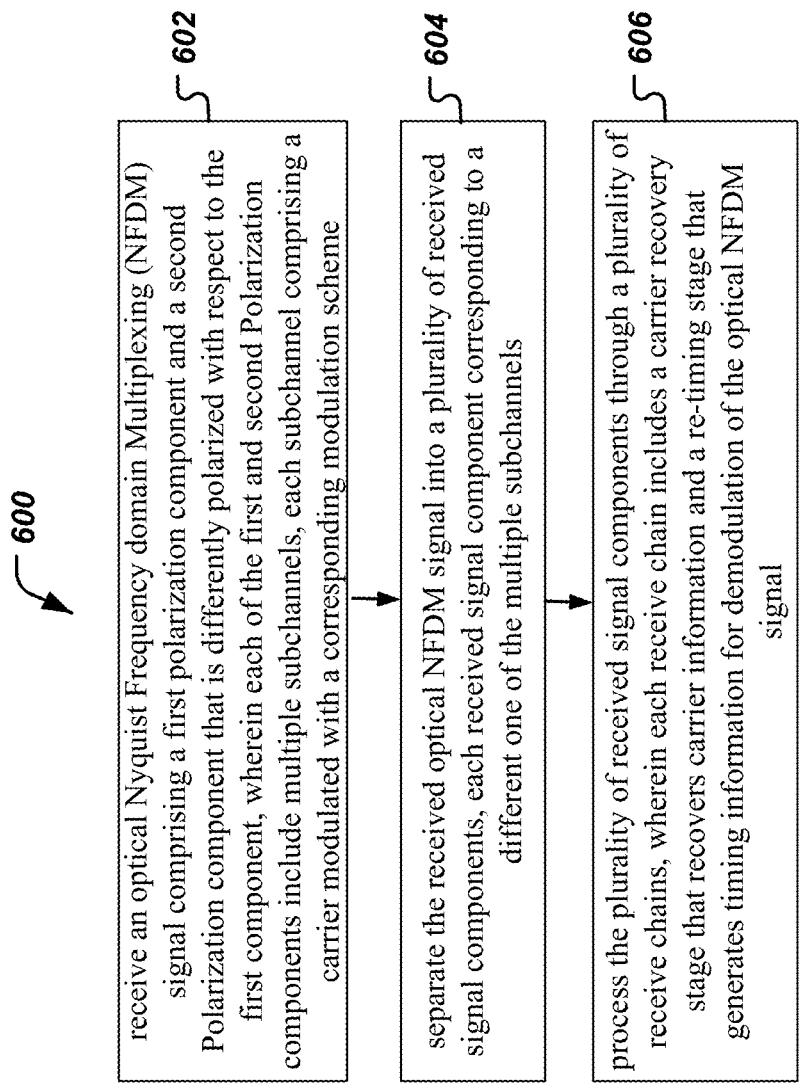
FIG. 6 is a flowchart representation of a process of optical communication.

FIG. 6 is a flowchart representation of a process 600 of optical communication. In some implementations, the process 600 is implemented at the receiver-side of an optical communication system. At 602, an optical Nyquist Frequency domain Multiplexing (NFDM) signal comprising a first polarization component and a second polarization component that is polarized with respect to the first polarization component is received. The optical NFDM signal may be received, e.g., over an optical communication medium such as a fibre optic link. In some implementations, the transmitted signal may have orthogonal or differently polarized component, but depending on optical transmission properties of the medium, when received, the first and the second component need not be orthogonal. In some implementations, non-orthogonal first and second components may be used by design. In some implementations, each of the first and second components include multiple subchannels and each subchannel may comprise a carrier modulated with a corresponding modulation scheme is received. For example, as depicted in FIG. 2, some implementations may include 5 subchannels. Other number of subchannels are also possible. Each subchannel in general may have a different bandwidth and a different modulation scheme.

At 604, separating the received optical NFDM signal into a plurality of received signal components, each received signal component corresponding to a different one of the multiple subchannels. In some implementations, the signal separation is achieved in the analog domain. In some implementations, the signal separation is achieved in digital domain. In some implementations, e.g., as previously discussed with respect to FIG. 3, the first and the second polarization components (x- and y-polarization components) are separated from each other prior to separation into plurality of received signal components.

At 606, processing the plurality of received signal components through a plurality of receive chains, wherein each receive chain includes a carrier recovery stage and a re-timing stage. In some implementations, the receive chain previously described with respect to FIG. 3 is implemented. Upon processing through the receive chain, modulated symbol estimates from the x-polarized component and the y-polarized component are recovered. From the symbol estimates, digital data is recovered using one of several possible techniques. In some implementations, each receive chain is independently operated to perform coherent demodulation by recovering carrier and timing from the received signal. In some implementations, one of the subchannels is selected as a "reference subchannel" that is used to recover the timing information and carrier frequency/phase information. The reference subchannel may be selected based on a channel quality criterion such as a subchannel having the best measured signal to noise ratio. In the inventor's experience, the best subchannel is often the subchannel with the lowest frequency band. For example, referring to FIG. 2, subband 3 206, 216 often has the best (highest) signal to noise ratio. In some implementations, therefore, the subband having the densest constellation may be used for carrier timing/phase recovery.

Figure 7:
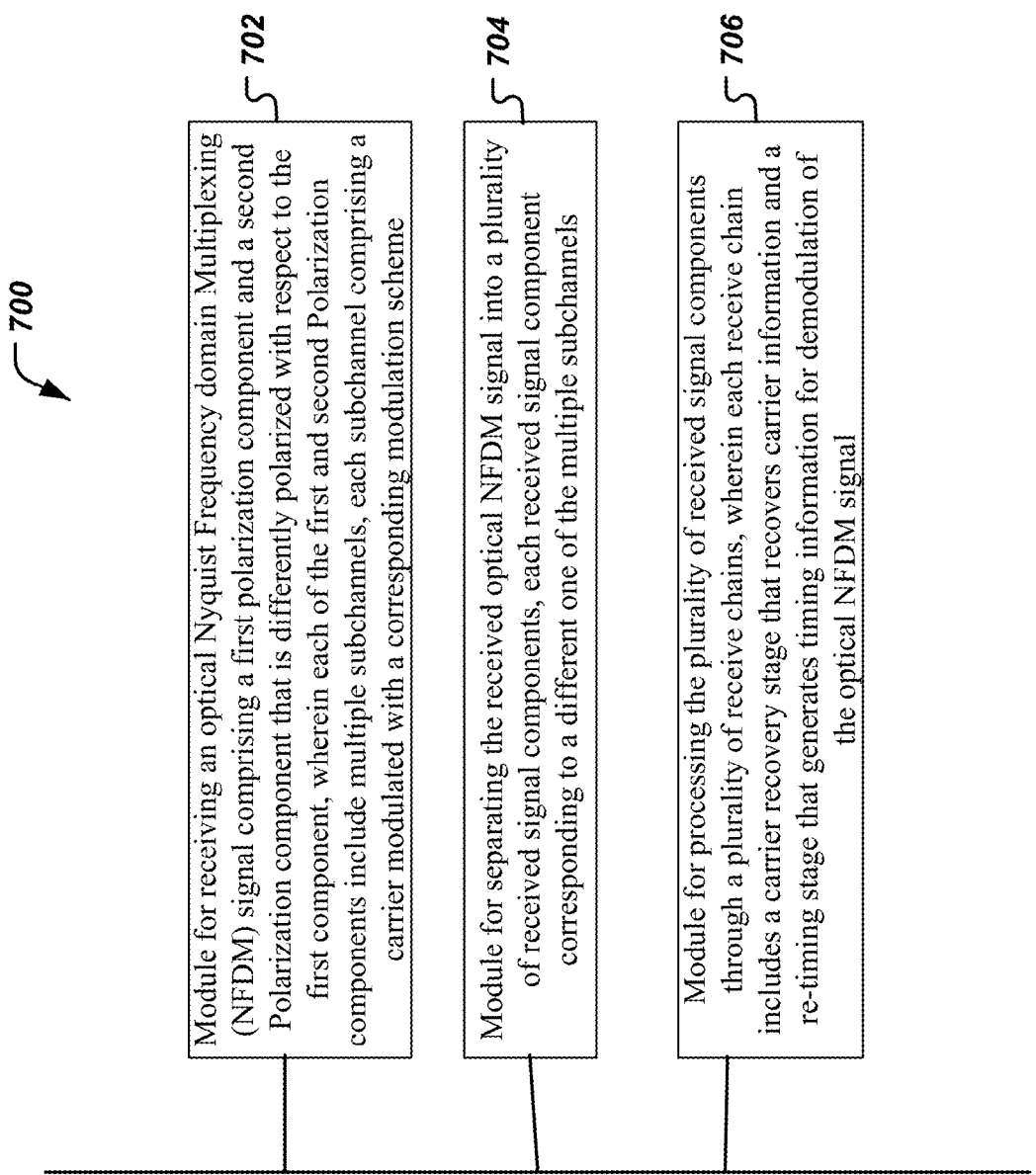
FIG. 7 is a block diagram representation of a portion of an optical communications receiver.

FIG. 7 is a block diagram representation of an optical communications apparatus 700. The module 702 is for receiving an optical Nyquist Frequency domain Multiplexing (NFDM) signal comprising a first component and a second component that is differently (e.g., orthogonally) polarized with respect to the first component, wherein each of the first and second components include multiple subchannels, each subchannel comprising a carrier modulated with a corresponding modulation scheme. The module 704 is for separating the received optical NFDM signal into a plurality of received signal components, each received signal component corresponding to a different one of the multiple subchannels. The module 706 is for processing the plurality of received signal components through a plurality of receive chains, wherein each receive chain includes a carrier recovery stage and a re-timing stage. The apparatus 700 and modules 702, 704, 706 may further be configured to implement some of the techniques disclosed in this document.

Figure 8:
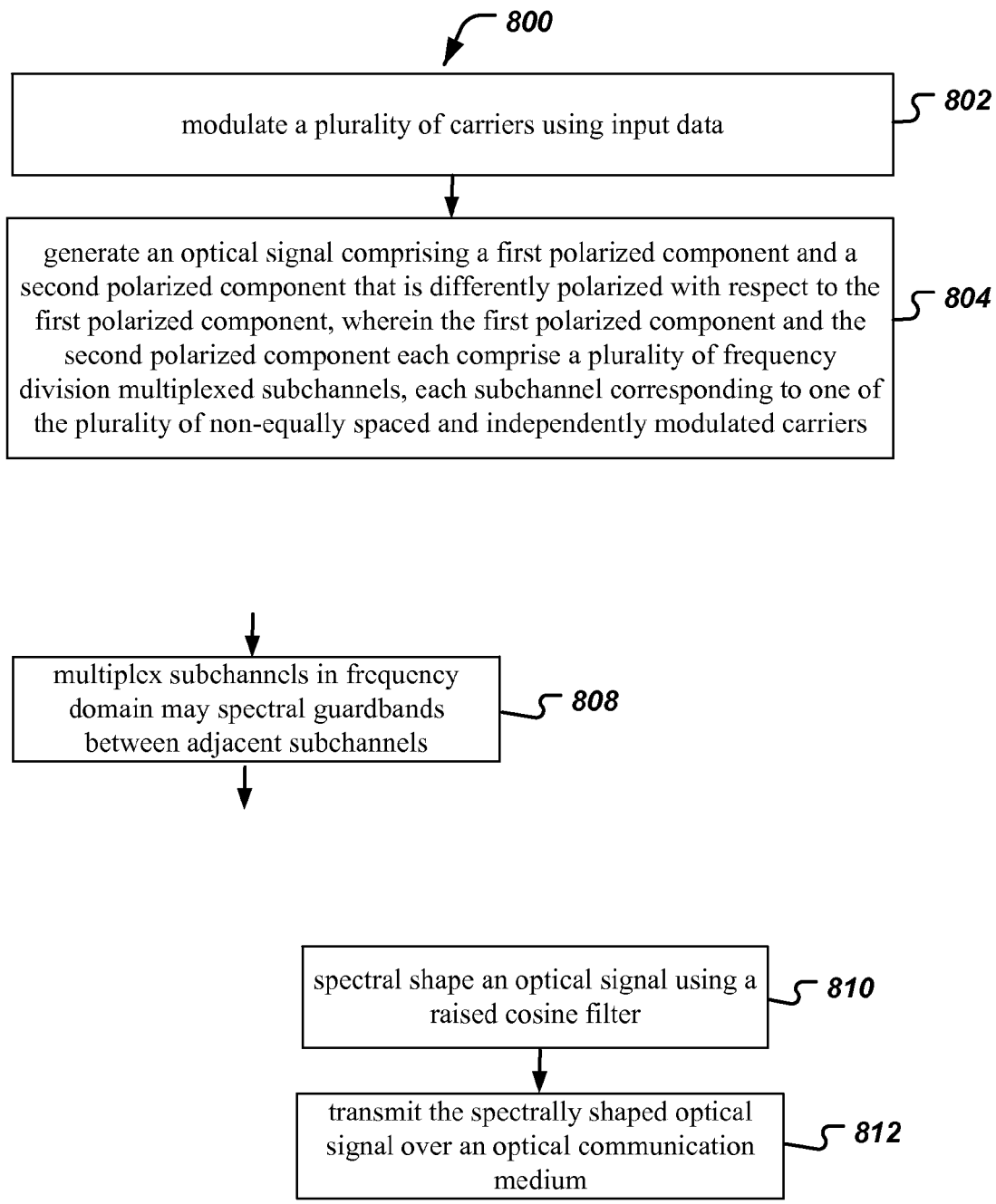
FIG. 8 is a flowchart representation of a process of optical communication.

FIG. 8 is a flowchart representation of a process 800 of optical communication. In some embodiments, the process 800 is implemented at the transmitter-side of an optical communication system. At 802, a plurality of carriers are modulated using input data. As previously discussed, the modulation bandwidth and constellation of the plurality of carriers may generally be different. Furthermore, implementations may choose to have or not have a guard band between adjacent modulated carriers. In some implementations, e.g., when the optical transmission medium is expected to produce large dispersion or echoes, guard bands may be utilized to ensure low bit error rate (808). In some implementations, the method 800 may further include spectrally shaping an optical signal using a raised cosine filter (810) and transmitting over the optical communication medium (812).

Figure 9:
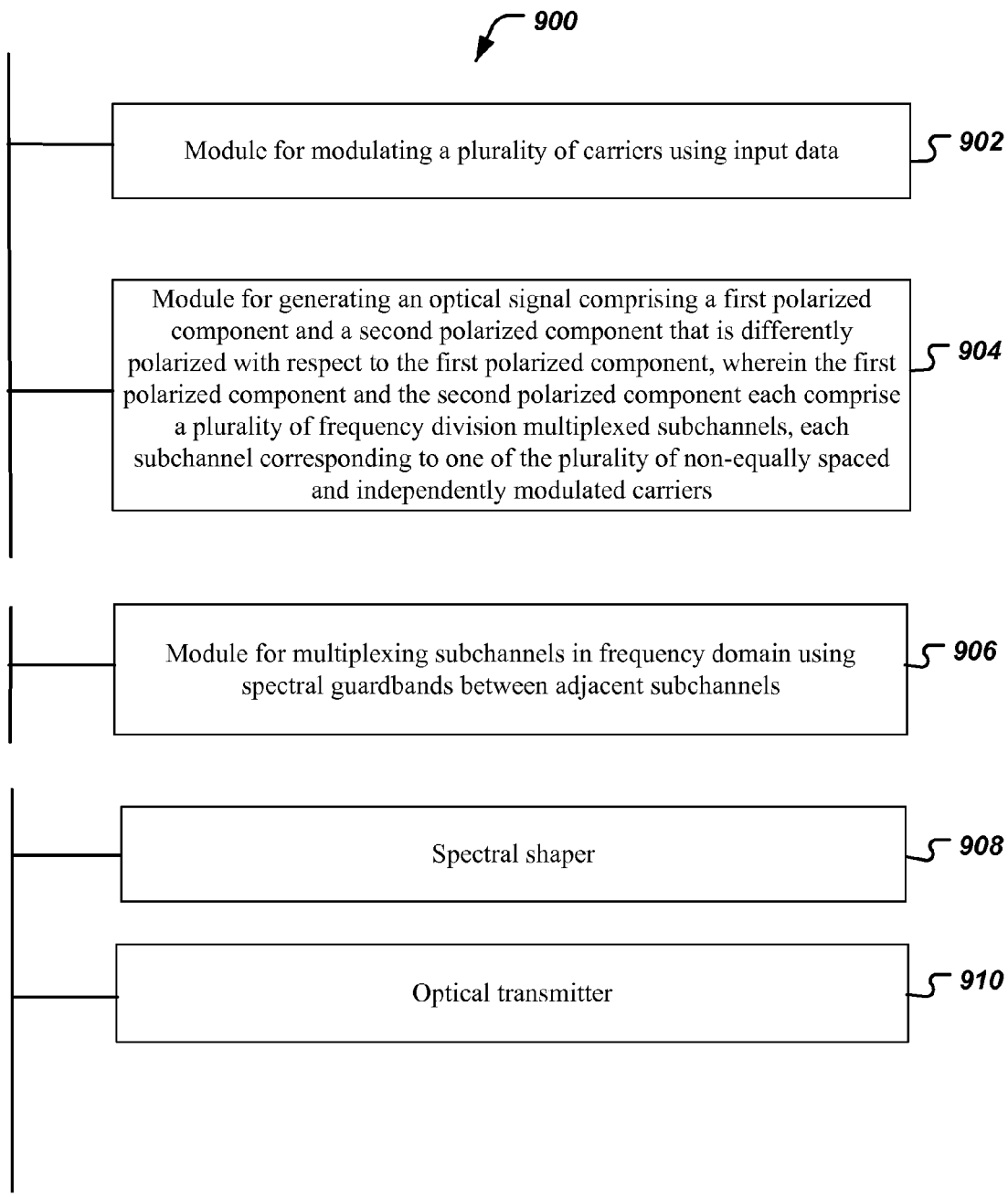
FIG. 9 is a block diagram representation of a portion of an optical communications transmission apparatus.

FIG. 9 is a block diagram representation of an optical communications apparatus 900. The module 902 is for modulating a plurality of carriers using input data. Furthermore, implementations may choose to have a module to multiplex subchannels with a guard band between adjacent modulated carriers (906). The module 904 is for generating an optical signal comprising a first polarized component and a second polarized component that is orthogonally polarized with respect to the first polarized component, wherein the first polarized component and the second polarized component each comprise a plurality of frequency domain multiplexed subchannels, each subchannel corresponding to one of the plurality of modulated carriers. The apparatus 900 may also include a spectral shaper (908) shaping an optical signal using a raised cosine filter and an optical transmitter (910) transmitting the spectrally shaped optical signal over an optical communication medium.

FIG. 9 is a block diagram representation of an optical communications apparatus 900. The module 902 is for modulating a plurality of carriers using input data. The module 904 is for generating an optical signal comprising a first polarized component and a second polarized component that is orthogonally polarized with respect to the first polarized component, wherein the first polarized component and the second polarized component each comprise a plurality of frequency domain multiplexed subchannels, each subchannel corresponding to one of the plurality of modulated carriers. The apparatus 900 and modules 902, 904 can be further configured to implement some of the techniques described in this document.

Appendix A, entitled "Dual-Polarization Coherent Optical Nyquist Frequency Division Multiplexing (DP-CO-NFDM) Receiver," of the priority document U.S. Provisional Patent Application No. 61/720,367 of the priority document U.S. Provisional Patent Application No. 61/720, 367, provides additional technical information on the disclosed technology.

It will be appreciated that a DP-CO-NFDM receiver for demodulating an incoming signal is disclosed. The receiver includes several Nyquist subchannels, which basically includes a coherent optical front end, optical-to-electrical converters, analog-to-digital converters, and a single application-specific integrated circuit (ASIC) unit for signal demodulation.

It will further be appreciated that digital demodulation for all subchannels can be concurrently processed in parallel, e.g., by a single ASIC unit, and its function includes but not limited to multiband software-defined RF front-end for signal downconversion, electrical dispersion compensation (EDC), polarization and carrier recovery, inter-symbol interference (ISI)/inter-channel interference (ICI) canceller, and nonlinear compensation.

It will further be appreciated that signal processing algorithms for polarization and carrier recovery can be selected adaptively according to the bit-loading level of each Nyquist subchannels. The digital downconversion and match filtering can be done adaptively to the carrier frequency, the symbol rate, and also the roll-off factor of (root-square) raised-cosine filter shape of each Nyquist subchannels.

It will further be appreciated that the above-described DP-CO-NFDM modulation technique offers several advantages over traditional OFDM techniques. For example, the use of dual polarization facilitates higher throughput in a given frequency bandwidth. The use of non-equally spaced, independently modulated carriers advantageously can be used to reduce the peak to average power ratio (dynamic range) of the transmitted signal. The reduced dynamic range facilitates low-cost implementations that maintain linearity. Furthermore, because each carrier is independently modulated using its own constellation, each carrier can be recovered using known QAM or QPSK demodulation techniques (e.g., blind demodulations). In one advantageous aspect, the transmitted signal can therefore be constructed without overheads such as cyclic prefixes and guard bands. In addition, as previously discussed, a subchannel with the highest SNR can be used to recover timing and carrier information for all subchannels, thereby facilitating reception of all subchannels using a single controller.

The disclosed and other embodiments, modules and the functional operations described in this document (e.g., the optical front end, the polarization detector, the multi-band signal processor, the splitter, a receive chain, a data modulator, a signal generator, a spectrum shaper and an optical transmitter, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is disclosed and illustrated, including:

1. An optical communications method for receiving and processing an optical signal at an optical receiver, comprising:
receiving an optical Nyquist Frequency Division Multiplexing (NFDM) signal comprising a first polarization component and a second polarization component that is differently polarized with respect to the first polarization component, wherein each of the first and second polarization components include multiple subchannels, each subchannel comprising a carrier modulated with a corresponding modulation scheme;
separating the received optical NFDM signal into a plurality of received signal components, each received signal component corresponding to a different one of the multiple subchannels; and
processing the plurality of received signal components through a plurality of receive chains, wherein each receive chain includes a carrier recovery stage that adaptively recovers carrier information according to a bit-loading level of each subchannel and a re-timing stage that generates timing information for demodulation of the optical NFDM signal.

2. The method recited in claim 1, wherein:
a first subchannel of the first polarization component occupies a bandwidth different from that of a second subchannel of the first component.

3. The method recited in claim 2, wherein:
the first subchannel of the first polarization component uses a different modulation constellation than the second subchannel of the first polarization component.

4. The method recited in claim 1, further comprising:
selecting a receive chain for controlling carrier recover and re-timing operations of the plurality of receive chains, and
controlling operation of the carrier recover stages and the re-timing stages using results from the selected receive chain.

5. The method recited in claim 4, further comprising:
measuring a signal to noise ratio of the received optical NFDM signal for each subchannel; and
wherein the selected receive chain corresponds to the subchannel having a best measured signal to noise ratio.

6. An optical communication apparatus, comprising:
an optical front end that receives an optical Nyquist Frequency Division Multiplexing (NFDM) signal comprising a first polarization component and a second polarization component that is differently polarized with respect to the first polarization component, wherein each of the first and second polarization components include multiple subchannels, each subchannel comprising at least one subcarrier;
a polarization detector that separates the received optical NFDM signal into a plurality of received signal components, each received signal component corresponding to a different one of the multiple subchannels; and
a multi-band signal processor that processes the plurality of received signal components through a plurality of receive chains, wherein each receive chain includes a carrier recovery stage that adaptively recovers carrier information according to a bit-loading level of corresponding subchannel and a re-timing stage that generates timing information for demodulation of the optical NFDM signal.

7. The apparatus recited in claim 6, wherein:
a first subchannel of the first polarization component occupies a bandwidth different from that of a second subchannel of the first polarization component.

8. The apparatus recited in claim 7, wherein:
the first subchannel of the first polarization component uses a different modulation constellation than the second subchannel of the first polarization component.

9. The apparatus recited in claim 6, wherein the first component includes N subchannels, where N is a positive integer, and wherein the multi-band signal processor includes:
a selector that selects a receive chain for controlling carrier recover and re-timing operations of the plurality of receive chains, and
a receive chain controller that controls operation of the carrier recover stages and the re-timing stages using results from the selected receive chain.

10. An optical communications method, comprising:
modulating a plurality of carriers using input data to produce a plurality of non-equally spaced and independently modulated carriers; and
generating an optical signal comprising a first polarized component and a second polarized component that is differently polarized with respect to the first polarized component, wherein the first polarized component and the second polarized component each comprise a plurality of frequency division multiplexed subchannels, each subchannel corresponding to one of the plurality of non-equally spaced and independently modulated carriers.

11. The method recited in claim 10, wherein one subchannel from the plurality of frequency division multiplexed subchannels occupies a different bandwidth than all other sub channels.

12. The method recited in claim 10, further comprising:
spectral shaping the optical signal using a raised cosine filter; and
transmitting the spectrally shaped optical signal over an optical communication medium.

13. The method recited in claim 10, wherein the generating the optical signal further comprises:
multiplexing the subchannels in frequency domain using spectral guardbands between adjacent subchannels.

14. An optical communications apparatus, comprising:
a data modulator that modulates a plurality of carriers using input data to produce a plurality of non-equally spaced and independently modulated carriers; and
a signal generator that generates an optical signal comprising a first polarized component and a second polarized component that is differently polarized with respect to the first polarized component, wherein the first polarized component and the second polarized component each comprise a plurality of frequency division multiplexed subchannels, each subchannel corresponding to one of the plurality of non-equally spaced and independently modulated carriers.

15. The apparatus recited in claim 14, wherein one subchannel from the plurality of frequency division multiplexed subchannels occupies a different bandwidth than all other subchannels.

16. The apparatus recited in claim 14, further comprising:
a spectrum shaper that spectrally shapes the optical signal using a raised cosine filter; and
an optical transmitter that transmits the spectrally shaped optical signal over an optical communication medium.

17. The apparatus recited in claim 14, wherein the signal generator further comprises:
a multiplexer that multiplexes the subchannels in frequency domain by inserting spectral guardbands between adjacent subchannels.

18. An optical communication system comprising:
a transmitter configured to generate a dual polarized coherent optical Nyquist Frequency Division Multiplexing (NFDM) signal comprising a first component and a second component that is differently polarized with respect to the first component, wherein each of the first and second components include multiple subchannels, each subchannel comprising a non-equally spaced carrier modulated with an independent modulation scheme; and
a receiver configured to receive and demodulate the dual polarized NFDM signal using a plurality of receive chains, wherein each receive chain corresponds to a subchannel and operates adaptively according to a bit-loading level of each subchannel, such that a subchannel having a best signal to noise ratio is used to control carrier frequency and timing recover of all receive chains.

* * * * *